3,096,312
POLYMERS AND COPOLYMERS OF
5-VINYLTETRAZOLE
Ronald A. Henry, China Lake, Calif., assignor to the United States of America as represented by the Secretary of the Navy
No Drawing. Filed Aug. 26, 1960, Ser. No. 52,310
7 Claims. (Cl. 260—78.5)
(Granted under Title 35, U.S. Code (1952), sec. 266)

The invention described herein may manufactured and used by or for the Government of the United States of America for governmental purposes without the payment of any royalties thereon or therefor.

The present invention relates to new and valuable chemical compounds and to the preparation thereof, said compounds comprising polymers and copolymers of 5-vinyltetrazole.

Since numerous attempts to synthesize monomeric 5-vinyltetrazole have been unsuccessful, probably because of the reactivity of the carbon-carbon double bond, the preparation of its polymers has not been previously accomplished.

It is, therefore, an object of this invention to provide a simple and direct process for the synthesis of polymers and copolymers of 5-vinyltetrazole which could be used as energy-containing binders for solid propellants or for pyrotechnics.

Another object of this invention is to provide a simple process for producing compounds leading to a high tetrazole content and a high heat of explosion useful for propellant applications.

Still another object of this invention is to produce compositions which should be especially valuable in systems based on boron-nitrogen reactions.

In accordance with the present invention a series of new compounds may be prepared by the conversion of a nitrile group to a tetrazole ring by heating with ammonium azide or an alkyl substituted ammonium azide in dimethylformamide at 100–130° C. for about 24 hours. The following materials have been converted by heating for 24 hours with ammonium azide: polyacrylonitrile, copolymer of styrene and acrylonitrile, copolymer of vinylidene cyanide and vinyl acetate, copolymer of acrylonitrile and methyl methacrylate. All of these derivatives of 5-vinyltetrazole are soluble in aqueous sodium bicarbonate solution and are precipitated upon acidification. Poly(5-vinyltetrazole) and the material from the vinylidene cyanide copolymers decompose vigorously when heated rapidly to 300° C.

The following examples serve to illustrate how the present invention may be carried out in practice; however, the invention is not restricted to the examples.

EXAMPLE I

Poly(5-Vinyltetrazole)

10.6 g. (0.2 mole) of polyacrylonitrile, containing 25.5% nitrogen by analysis, are dissolved in 200 ml. of dimethylformamide with stirring. 14.4 g. (0.22 mole) of sodium azide and 11.7 g. (0.22 mole) of ammonium chloride are now added, and the mixture heated for 24 hours at 120–125° C. during which time ammonia is evolved. After about one hour the solution becomes opaque, very viscous and rubbery. Dimethylformamide (100 ml., more or less) is added to get an easily stirred mixture. After 16 hours the solution becomes clear and fluid. This solution is cooled to around 80° C. and the solvent removed by distillation under reduced pressure leaving a gummy residue which is now dissolved in about 250 ml. of water containing 20 g. of sodium bicarbonate. This solution is carefully neutralized by the slow dropwise addition of 0.7 N hydrochloric acid solution until incipient precipitation. Stirring is essential and each drop of acid should be allowed to react before the next drop is added. The resulting solution is next filtered through a sintered glass funnel, and filtrate poured slowly into 500 ml. of an ice-cold solution of 0.7 N hydrochloric acid which is being stirred in a high-speed agitator. A white curdy precipitate forms and the supernatant solution is decanted off. The polymer is washed until free of chloride by the process of agitating in ice-cold water, settling, and decanting. It is necessary to keep the solution cold; otherwise, the polymer becomes gummy and the small curds clump into a large rubbery mass. This precipitate is rapidly filtered and dried in a vacuum desiccator. Additional drying may be accomplished in a vacuum oven at 55° C. The product is tan-colored, friable material which is easily reduced to a powder. It is insoluble in dioxane or glacial acetic acid; soluble in dimethylformamide and aqueous base solutions. The experimental results compare favorably with a compound having the formula $(C_3H_4N_4)_x$:

For $(C_3H_4N_4)_x$: C=37.50; H=4.19; N=58.31.
Found: C=36.08; H=4.75; N=55.45.

EXAMPLE II

Copolymer of Styrene and 5-Vinyltetrazole

Following the same procedure outlined in Example I, 20 g. of a copolymer of styrene and acrylonitrile (8.03% nitrogen by analysis) was converted to the corresponding styrene-tetrazole copolymer by reaction with ammonium azide (10% excess). Isolation and purification of the acid form of the polymer were accomplished in the same manner as described in Example I. The copolymer obtained is a hard, horny mass that is difficult to grind to a powder and to dry completely. The analyses suggest a moisture content of about 1.8%. Analysis of this product found:

C=70.70, 70.84; H=6.63, 6.75; N=20.91 (theory if there had been a 100% conversion of the cyano groups to tetrazole rings: 26.2% N).

In a second experiment using the same amount of the copolymer of styrene and acrylonitrile, but a 50% excess of ammonium azide a cheese-like product was recovered. Care was utilized in isolating and purifying this polymer and it was dried to a friable material (2 weeks at 60° C., 28" of mercury vacuum). An analysis of this composition found

C=70.20; H=6.28; N=21.91, 22.20.

EXAMPLE III

Copolymer of Methyl Methacrylate and 5-Vinyltetrazole 11.8 g. of a copolymer of methyl methacrylate and acrylonitrile which analyzed 5.84% N, is dissolved in 100 ml. of dimethylformamide and then reacted with 3.6 g. of sodium azide and 2.9 g. of ammonium chloride. Isolation, purification, and drying of the resulting polymer were accomplished in the same manner as described in Example I. The polymer obtained is tan-color, soluble in dimethylformamide and slightly soluble in acetone. An analysis of this composition found:

C=52.05; H=5.92; N=20.38, 20.53; non-combustible residue=3.1%.

(If the cyano groups in the starting polymer had been converted 100% to tetrazole groups, the percentage nitrogen in the final polymer should have been 26.2%.)

EXAMPLE IV

Copolymer of Vinyl Acetate and 1,1-Bis(5-Tetrazolyl)Ethylene

A copolymer of vinyl acetate and vinylidene cyanide (50:50 mole ratio, 16.66% nitrogen by analysis) was converted to the corresponding tetrazole derivative by the procedure described in Example I. It is imperative that the precipitation of the polymer in the acid form from an aqueous solution of its sodium salt and the subsequent washing with water to remove sodium chloride be done with ice-cold solutions; otherwise, the soft, fibrous masses tend to agglomerate and when dry give a hard, horny product. If the chloride-free polymer is freeze-dried, it is obtainable as a white, fibrous, easily pulverized product. An analysis of this polymer corresponds favorably with the empirical formula,

where $CHN_4$ is

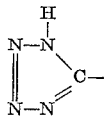

*Analysis.*—Calculated: C=38.40; H=4.03; N=44.78. Found (first preparation): C=40.47; H=5.40; N=38.75; incombustible residue=0.8. Found (second preparation): C=39.06; H=4.96; N=37.82, 37.84; incombustible residue=2.0%.

EXAMPLE V

*Hydrazine Salt of Poly(5-Vinyltetrazole)*

1.3 g. of vacuum dried poly(5-vinyltetrazole) (from Example I) was slurried in 1 ml. of 95% ethanol and treated with 0.5 g. of 95% hydrazine. There was an immediate warming and change in the character of the starting polymer. It did not dissolve, however. After two days at ambient temperature the polymer was dissolved to yield a viscous solution by adding 10 ml. of water. The solution was evaporated to dryness under reduced pressure, the gummy product dissolved in 15 ml. of water, and then freeze-dried. The resulting polymeric salt was still gummy and difficult to dry. A portion was further dried for 48 hours at 60° C., 28″ mercury vacuum. This polymer is somewhat hygroscopic. An elemental analysis of this product compares favorably with the analytical calculations for a molecule having the formula $(C_2H_8N_6)_x$:

*Analysis.*—Calculated: C=28.12; H=6.29; N=65.59. Found (corrected to anhydrous basis): C=30.04; H=6.35; N=63.18.

Apparently some hydrazine was lost during the drying in the vacuum oven (carbon content higher than theory, nitrogen content lower than theory). A sample of the salt originally recovered by freeze drying the aqueous solution was dried in a vacuum desiccator over calcium chloride for 48 hours and then analyzed:

*Analysis.*—Found (corrected to an anhydrous basis): C=48.48; H=6.59; N=64.12.

EXAMPLE VI 3 g. poly(5-vinyltetrazole) was added to 25 g. of 95% hydrazine and allowed to stand at room temperature in a tightly stoppered flask until completely dissolved. The solution was then frozen and the excess hydrazine removed at about 1 mm. pressure. The product obtained was a somewhat rubbery gum.

Lithium azide, trimethylammonium azide, or other ionic azides soluble in dimethylformamide may be employed instead of ammonium azide. Solvents other than dimethylformamide may be employed; for example, dimethyl sulfoxide. The temperature of the reaction may be varied over the range of about 100° C. to about 150° C.; the lower the temperature, however, the longer the reaction time. At the higher temperature care must be taken to prevent undesirable thermal decompositions of the product or reactants.

Other copolymers of acrylonitrile, vinylidene cyanide, and methacrylonitrile could be employed besides those mentioned in the examples. The ratio of co-monomers in these co-polymers could be varied widely. The physical properties of the polymers or copolymers of 5-vinyltetrazole can be varied by modifying the molecular weight of the acrylonitrile polymers being converted by reaction with ammonium azide.

The extent of conversion of the cyano groups (—CN) in the starting acrylonitrile polymers or copolymers to tetrazole rings can be varied from zero to 100% by controlling the ratio of ammonium azide to the cyano groups in the reaction.

It can be seen from the foregoing that this invention provides a simple method for synthesizing polymers and copolymers of 5-vinyltetrazoles in pure form, and that various modifications are possible and may be obviously resorted to by those skilled in the art without departing from the spirit and scope of the invention as hereinafter defined by the appended claims.

What is claimed is:

1. The copolymer of 1,1-bis(5-tetrazolyl)ethylene and vinyl acetate having the empirical formula

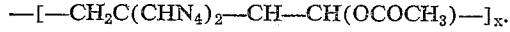

2. A process for the preparation of a polymer of poly 5-vinyltetrazole which comprises heating polyacrylonitrile in a solution of dimethylformamide with sodium azide and ammonium chloride at a temperature of 120–125° C. for about 24 hours.

3. The product of claim 2 which has the empirical formula $(C_3H_4N_4)_x$.

4. A process for the production of a polymer of the hydrazine salt of poly(5-vinyltetrazole) which comprises reacting poly(5-vinyltetrazole) with hydrazine at ambient temperature for about 48 hours.

5. The product of claim 4 which has the empirical formula $(C_3H_8N_6)_x$.

6. A process for the production of a styrene-5-vinyltetrazole polymer which comprises heating a copolymer of styrene and acrylonitrile with ammonium azide.

7. The styrene-5-vinyltetrazole polymer of claim 6.

References Cited in the file of this patent

UNITED STATES PATENTS 2,594,560   Howard _____ Apr. 29, 1952